United States Patent [19]

Bond et al.

[11] Patent Number: 4,581,485

[45] Date of Patent: Apr. 8, 1986

[54] DATA STORAGE SYSTEM FOR TELEPHONE ANSWERING MACHINE

[75] Inventors: Raymond G. Bond, Long Beach; Masroor A. Batla, Saugus, both of Calif.

[73] Assignee: T.A.D. Avanti, Inc., Compton, Calif.

[21] Appl. No.: 543,352

[22] Filed: Oct. 19, 1983

[51] Int. Cl.[4] ............................................. H04M 1/64
[52] U.S. Cl. .................................. 179/6.13; 179/6.16; 179/6.03
[58] Field of Search ................... 179/6.01, 6.03, 6.13, 179/6.16

[56] References Cited

U.S. PATENT DOCUMENTS

| | | | |
|---|---|---|---|
| 3,914,551 | 10/1975 | Hant | 179/6.13 |
| 4,304,968 | 12/1981 | Klausner et al. | 179/6.03 |

FOREIGN PATENT DOCUMENTS

| | | | |
|---|---|---|---|
| 0057854 | 8/1982 | European Pat. Off. | 179/6.03 |
| 2633882 | 2/1978 | Fed. Rep. of Germany | 179/6.16 |
| 3024688 | 1/1982 | Fed. Rep. of Germany | 179/6.03 |

*Primary Examiner*—Aristotelis M. Psitos
*Attorney, Agent, or Firm*—Keith D. Beecher

[57] ABSTRACT

A non-destruct data storage system in a telephone answering machine, by which certain data is modulated on the beep tones which are recorded on the magnetic message tape and/or on the magnetic announcement tape so that the data may be maintained in the event of a power failure, or for other purposes.

8 Claims, 1 Drawing Figure

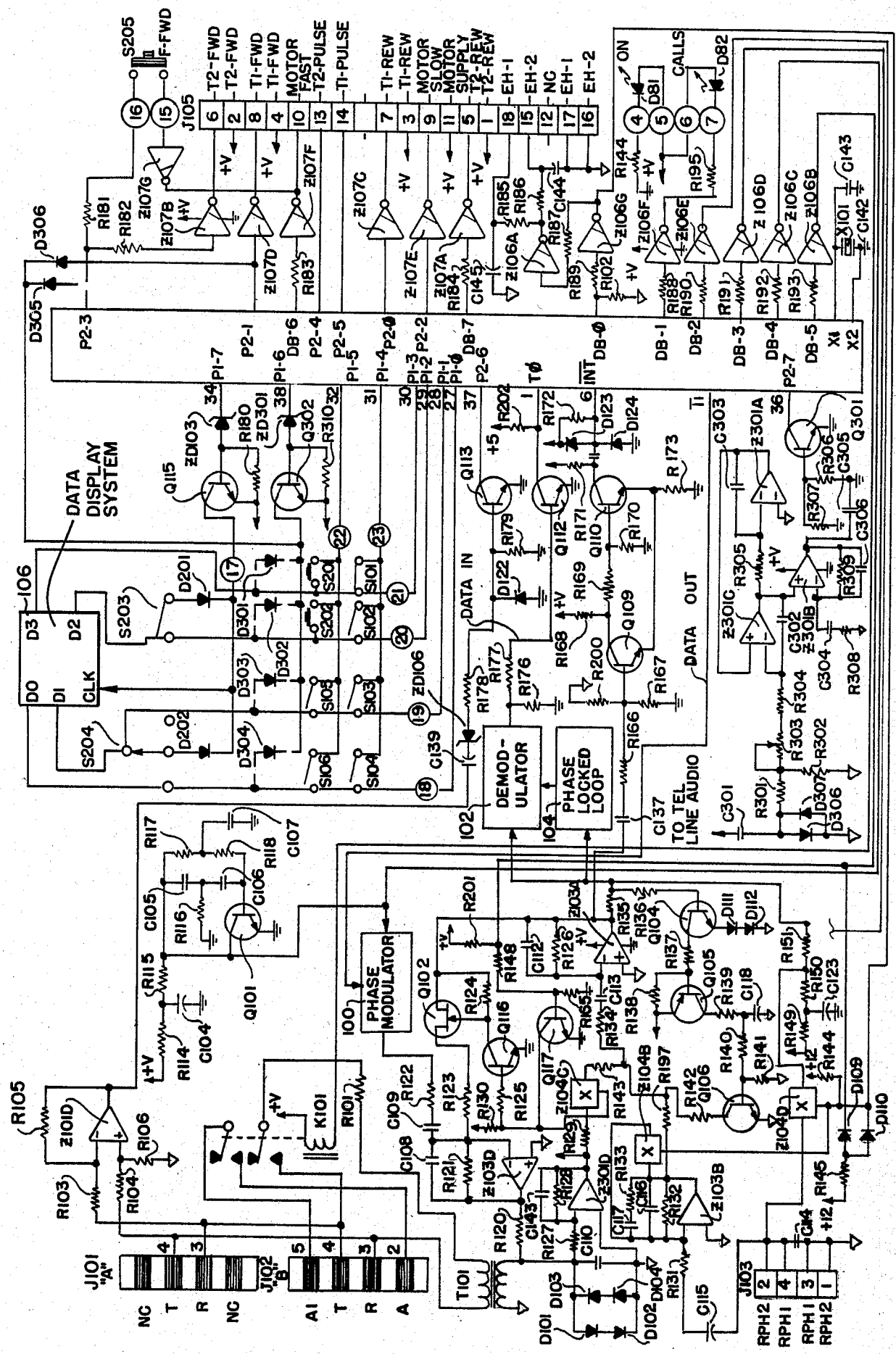

DATA STORAGE SYSTEM FOR TELEPHONE ANSWERING MACHINE

BACKGROUND OF THE INVENTION

The data storage system of the invention is particularly useful in the microcomputer controlled type of telephone answering machine, so that essential data which is normally stored in the volatile memory of the microcomputer may also be recorded on magnetic tape. In this way, the information may be preserved in the event of power failure, or the like, so as to obviate any need for a battery back-up for the machine.

The data storage system of the invention permits essential information such as data designating the positions of the message and announcement tapes, the number of messges recorded on the message tape, data designating the various settings of the machine, and other data, to be preserved in the event of power failure, and which may be used to reset the machine to its previous operational modes when power is restored, and which may also be displayed to the user, either on the machine itself, or on the remote unit used to control the machine from a remote telephone.

The modulation of the data on the beep tone simplifies the data recording and reproduction processes and equipment since it obviates any need for multiple tracks on the magnetic tapes and multiple recording and reproducing heads for the tapes. The data storage system of the invention is for use in telephone answering machines which include a sensing circuit that responds to a ring signal on the telephone line to activate the machine. When the machine is so activated, an announcement recorded on an announcement tape (T-1) is transmitted over the telephone line to the calling party during a time interval ($T_1$). A message recording tape (T-2) is then activated in order that the calling party may record his message during a subsequent time interval ($T_2$).

BRIEF DESCRIPTION OF THE DRAWING

FIG. 1 is a schematic circuit diagram of a telephone answering machine incorporating the data storage system of the present invention in one of its embodiments.

DETAILED DESCRIPTION OF THE ILLUSTRATED EMBODIMENT

The telephone answering machine shown in the drawing includes a microcomputer Z108 which may be of the type manufactured and sold by National Semiconductor Company, and which is designated by them as INS8048. The machine also includes a connector J102 which has terminals 3 and 4 connected to the tip and ring terminals of the telephone line. Line seizure is effectuated by a relay K101. The machine is connected to the telephone line through a transformer T101. The outgoing audio signal corresponding to the announcement recorded on the (T-1) tape, and which is transmitted by the machine during the announcement interval ($T_1$), is amplified by an amplifier Z103D. The incoming audio signals to be recorded on the message tape (T-2) during the following message interval ($T_2$) are amplified by an amplifier Z103A. A connector J103 is connected to a record and reproduce head RPH2 associated with the T-2 message tape, and to a record and reproduce head RPH1 associated with the T-1 announcement tape.

The incoming audio signals representing the message to be recorded on the T-2 message tape are passed through transformer T101 and through a bilateral analog switch Z104D to amplifier Z103A, and through a bilateral analog switch Z104C to the record/reproduce head RPH2 to be recorded on message tape T-2. Resistors R149, R150 and R151, together with grounded capacitor C123 provide a bias circuit for the head. An automatic gain control circuit for amplifier Z103A is provided by the circuit of transistors Q104, Q105 and Q106. The announcement recorded on the announcement tape T-1 is amplified by amplifier Z103B, and is fed through amplifiers Z103A and Z103D to transformer T101 for application to the telephone line.

The ring signal for the telephone answering machine is initiated when a ring signal occurs at the tip (T) and ring (R) terminals of connector J102. The ring signal is fed to an operational amplifier Z101D. The alternating current signal output of amplifier Z101D is fed to port P2-6 of microcomputer Z108, by way of a circuit formed by capacitor C139, resistor R178, diode D122, Zener diode ZD106, resistor R179 and transistor Q113. The microcomputer Z108 decides whether or not the alternating current output of amplifier Z101D is of proper duration and frequency to be a true ring signal, and if it is, the microcomputer activates the T-1 announcement tape, causes the telephone answering machine to go off hook, and causes the machine to play the announcement recorded on the announcement tape T-1 over the telephone line.

The audio signals corresponding to the announcement recorded on the T-1 tape are picked up by record head RP-1 and fed by way of capacitor C115 and resistor R113 to amplifier Z103B. The audio signals are then fed to amplifier Z103A and through field effect transistor (FET) Q102 to amplifier Z103D, from which they are fed to the line transformer T101. The line transformer transmits the outgoing audio announcement signals to the telephone line.

The beep tone is recorded on the T-1 announcement tape, and this beep tone is sensed at the port designated INT of the microcomputer. When the beep tone recorded on the T-1 announcement tape is recognized by the microcomputer, it causes port P2-1 to go to ground potential which releases the T-1 forward solenoid to stop the T-1 announcement tape.

The message recording cycle ($T_2$) now begins and, for that purpose, the message tape T-2 is activated to permit the recording of the message received from the calling party over the telephone line. During the $T_2$ cycle, audio signals from the telephone line are fed into the telephone answering machine from amplifier Z301D and through switch Z104C, which is now turned on. This switch permits the audio signals from the telephone line to be passed to the amplifier Z103A, and amplifier Z103A feeds the audio signals to the heads RPH2 of the T-2 message tape. Analog switch Z104D is turned on at this time by microcomputer Z108 causing port DB-0 to go low (0), and output R/$\overline{P}$ of Z106G to go high (1), so that audio may be applied to the T-2 heads RPH2. Amplifier Z103B is disabled at this time because analog switch Z104B is also turned on.

A beep tone oscillator formed by the circuit of transistor Q101 is activated when the microcomputer Z108 causes port DB-3 to go low (0), at which time the output (BE) of Z106D will go high (1). So long as the output (BE) is high, the beep oscillator will oscillate and generate a beep signal. The beep oscillator of transistor Q101 is a twin "T" oscillator circuit whose output frequency is approximately 1800 Hz. The beep signal continues for about one second, and is fed to amplifier Z103D by way of resistor R122 and capacitor C109. Z103D introduces the amplified beep signal to the telephone line by way of resistor R120, R121 and transformer T101. The beep signal is also fed through switch Z104C to amplifier Z103A to be recorded on the T-2 tape.

In the practice of the present invention, a phase modulator 100 is interposed in the line from the beep oscillator to amplifier Z103D. Data from the microcomputer Z108 which appears at port $T_1$ is fed to the phase modulator 100 in the form of a square wave, and is phase modulated on the beep signal. The square wave may have a frequency, for example, of 900 Hz, and it represents in digital coded manner data stored in the volatile memory of the microcomputer. The data may be encoded on the square wave in a series of fields, with the coded information of each field representing a particular piece of information. The phase modulation of the beep signal by the data is such to maintain a constant audible frequency insofar as the beep tone is concerned.

As mentioned above, the phase modulator enables the data to be recorded on the T-2 tape along with the beep tone, so as to obviate any need for separate tracks on the tape or separate record/reproduce heads. The data is also transmitted to the calling party along with the beep signal, and can be recovered and displayed by the calling party by an appropriate unit at the remote telephone.

The beep tone recorded on the T-2 message tape is amplified by amplifier Z103A, and is applied to a demodulator 02. Demodulator 102 operates in conjunction with a phase locked loop circuit 104 to produce the demodulated data at the output of demodulator 102, the data being applied through the circuit of transistor Q112 to port T0 of the microcomputer Z108.

Under normal circumstances, the microcomputer Z108 continues to operate in accordance with predetermined parameters and commands which are stored in its volatile memory. In the event of a power failure, for example, the necessary data, which has also been recorded on the T-2 tape as a modulation of the beep tone is not destroyed. Then, when power is restored, the information on the beep tone is used by the microcomputer Z108 to restore normal operation of the machine.

The data stored on the T-2 tape as a modulation of the beep signal may also be applied to a data display system 106, and the appropriate data may be displayed on a display included in the system.

It will be appreciated that while a particular embodiment of the invention has been shown and described, modifications may be made. It is intended in the following claims to cover all modifications which come within the true spirit and scope of the invention.

What is claimed is:

1. In a telephone answering machine, and which includes first means for recording an announcemeht and for causing the recorded announcement to be transmitted over the telephone line to a caller, and second means for recording messages received over the telephone line, the combination of: a microcomputer in which data relating to the operation of the telephone answering machine is stored, third means for generating a beep tone and for causing the beep tone to be recorded on at least one of the first and second means; circuit means connecting the third means to the one of the first and second means and including a data modulator connected to the microcomputer for modulating data from the microcomputer on the beep tone being recorded on the one of first and second means.

2. The combination defined in claim 1, in which said modulator comprises a phase modulator, and in which the data from the microcomputer is in the form of a square wave signal encoded by data to be modulated on the beep tone.

3. The combination defined in claim 1, and which includes a demodulator connected to the means on which the modulated beep tone is recorded for recovering the data modulated on the beep tone, and circuitry connecting the demodulator to the microcomputer for feeding the demodulated data to the microcomputer.

4. The combination defined in claim 1, and which includes display means connected to the demodulator for displaying the demodulated data from the demodulator.

5. The combination defined in claim 1, and which includes circuitry connecting the modulator to the telephone line to cause the modulated beep tone to be transmitted over the telephone line to a calling party.

6. The combination defined in claim 1, in which said telephone answering machine responds to ring signals received over a telephone line, and in which said first means comprises a magnetic tape mechanism (T-1) and causes the recorded announcement to be transmitted over the telephone line in response to a ring signal received over the telephone line.

7. The combination defined in claim 6, in which said second means comprises a magnetic tape mechanism (T-2) for recording messages received over the telephone line during a time interval ($T_2$) following the time interval ($T_1$).

8. The combination defined in claim 7, in which said third means comprises a beep oscillator connected to the microcomputer and controlled by the microcomputer.

* * * * *